(12) United States Patent
Jouppi et al.

(10) Patent No.: US 7,720,212 B1
(45) Date of Patent: May 18, 2010

(54) SPATIAL AUDIO CONFERENCING SYSTEM

(75) Inventors: Norman Paul Jouppi, Palo Alto, CA (US); Subramoniam N. Iyer, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1551 days.

(21) Appl. No.: 10/909,079

(22) Filed: Jul. 29, 2004

(51) Int. Cl.
*H04M 3/42* (2006.01)
*H04R 25/00* (2006.01)
*H04R 5/00* (2006.01)
*G06F 15/16* (2006.01)

(52) U.S. Cl. .................. 379/202.01; 370/351; 381/371; 381/17; 709/204

(58) Field of Classification Search ............. 379/202.01
See application file for complete search history.

(56) References Cited

U.S. PATENT DOCUMENTS

| | | | |
|---|---|---|---|
| 5,434,913 A | 7/1995 | Tung et al. | |
| 5,889,843 A | 3/1999 | Singer et al. | |
| 5,991,385 A | 11/1999 | Dunn et al. | |
| 6,011,851 A | 1/2000 | Connor et al. | |
| 6,038,330 A * | 3/2000 | Meucci, Jr. | 381/371 |
| 6,574,339 B1 * | 6/2003 | Kim et al. | 381/17 |
| 6,694,033 B1 * | 2/2004 | Rimell et al. | 381/307 |
| 6,813,360 B2 * | 11/2004 | Gentle | 381/23 |
| 7,333,622 B2 * | 2/2008 | Algazi et al. | 381/310 |
| 7,346,654 B1 * | 3/2008 | Weiss | 709/204 |
| 2001/0055398 A1 | 12/2001 | Pachet et al. | |
| 2002/0013813 A1 | 1/2002 | Matsuoka | |
| 2003/0031333 A1 | 2/2003 | Cohen et al. | |
| 2003/0044002 A1 | 3/2003 | Yaeger et al. | |

* cited by examiner

*Primary Examiner*—Curtis Kuntz
*Assistant Examiner*—Mohammad K Islam

(57) ABSTRACT

An audio conferencing system includes sending a signal of a sound at a sound location to a listening location. The system further includes establishing a relationship between a virtual listening location and a virtual sound location. The system processes the signal to provide a sound at the listening location seeming to have an analogous relationship between the listening location and the sound location as the relationship between the virtual listening location and the virtual sound location.

20 Claims, 3 Drawing Sheets

SPATIAL AUDIO CONFERENCING SYSTEM

BACKGROUND

1. Field of the Invention

The present invention relates generally to conferencing systems, and more particularly to audio conferencing systems.

2. Background of the Invention

Business is becoming ever more global and more distributed, and this has dramatically increased the need for more effective communication tools. Due to the number of limitations with current technology's audio conferencing tools, remote attendees are at a distinct disadvantage compared to those individuals at a primary meeting site.

First, traditional telephone technology provides only a single audio channel. However, it is well known that by using binaural audio (i.e., utilizing both ears), up to a 13 dB increase in effective signal-to-noise may be obtained through human perceptual abilities such as the "cocktail party effect". At a cocktail party, individuals with normal hearing can use both their ears and brain to selectively attend to and participate in multiple simultaneous conversations. In contrast, when multiple speakers are talking over the single audio channel, the result is usually completely unintelligible (unless one speaker is much louder than the others).

Second, conference phones often resort to half-duplex modes to reduce echoes. This can make taking turns in conversations awkward if participants from multiple locations start speaking at about the same time.

Third, audio conferencing devices are typically placed in less than optimal locations, such as on conference tables, where they are subject to noise sources, such as rustling of papers.

SUMMARY OF THE INVENTION

The present invention provides an audio conferencing system that includes sending a signal of a sound at a sound location to a listening location. The system further includes establishing a relationship between a virtual listening location and a virtual sound location. The system processes the signal to provide a sound at the listening location seeming to have an analogous relationship between the listening location and the sound location as the relationship between the virtual listening location and the virtual sound location.

Certain embodiments of the invention have other advantages in addition to or in place of those mentioned above. The advantages will become apparent to those skilled in the art from a reading of the following detailed description when taken with reference to the accompanying drawings.

DESCRIPTION OF THE PREFERRED EMBODIMENT

In the following description, numerous specific details are given to provide a thorough understanding of the invention. However, it will be apparent that the invention may be practiced without these specific details. In order to avoid obscuring the present invention, some well-known systems are not disclosed in detail.

Figure 1:
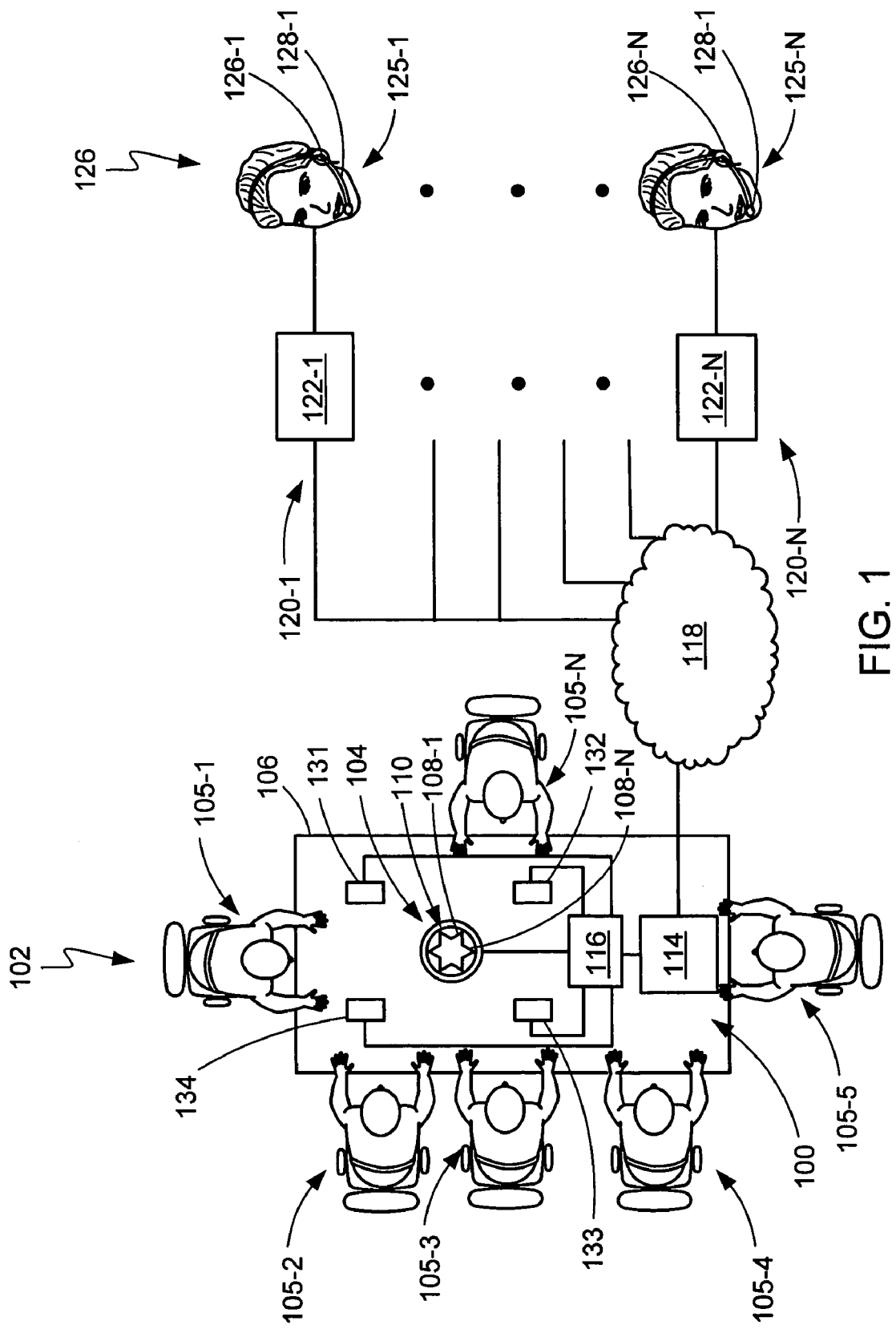
FIG. 1 is a view of a spatial audio conference system according to an embodiment of the present invention.

Referring now to FIG. 1, therein is shown a spatial audio conferencing system 100 according to an embodiment of the present invention. A portion of the spatial audio conferencing system 100 is located at a primary meeting site 102 and includes a sound pickup system 104. The sound pickup system 104 is placed at a sound location 106, such as on top of a conference room table around which local attendees 105-1 through N will sit at the primary meeting site 102.

The sound pickup system 104 is formed like a Lava Lamp but containing a number of small condenser microphones 108-1 through N on top and microphone preamplifiers 110 at the bottom. All but the bottom of the sound pickup system 104 is made with a clear plastic so the visual obstruction of the local attendees 105-1 through N of each other is minimized.

By placing the small condenser microphones 108-1 through N about a foot above the surface of the conference room table, the small condenser microphones 108-1 through N are moved directly out of the path of rustling papers and closer to the height of other local attendees' ears for picking up directional sounds at the sound location 106.

The sound pickup system 104 attaches to a personal computer (PC) 114. In another embodiment, the sound pickup system 104 connects to a separate sound card 116, which in turn connects to the PC 114. The separate sound card 116 is used for improved sound pickup and distribution over the sound card that is generally in most PCs.

The PC 114 is connected to a communication network 118, such as the Internet. At a number of remote locations 120-1 through N, a number of remote PCs 122-1 through N, respectively, are connected to the communication network 118 to receive signals from the PC 114.

At the remote locations 120-1 through N are remote attendees 125-1 through N, respectively. The remote attendees 125-1 through N have other portions of the audio conferencing system 100 including listening units 126-1 through N, respectively, connected to the remote PCs 122-1 through N, respectively.

The listening units 126-1 through N could each be multiple loud speakers and can be referred to as "listening locations", but in one embodiment the listening locations 126-1 through N include a communication system that uses inexpensive, light weight headsets, which are provided with noise-cancelling boom microphones 128-1 through N, respectively.

The noise-cancelling boom microphones 128-1 through N are connected through the remote PCs 122-1 through N, respectively, and to the communication network 118 to transmit signals to the PC 114. In one embodiment, the separate sound card 116 has a speaker unit 131 connected to it to provide sounds from the remote attendees 125-1 through N at the primary meeting site 102.

To provide directionality to or panning of the sounds from the remote attendees 125-1 through N, additional speakers 132 through 134 could also be connected to the separate sound card 116.

Figure 2:
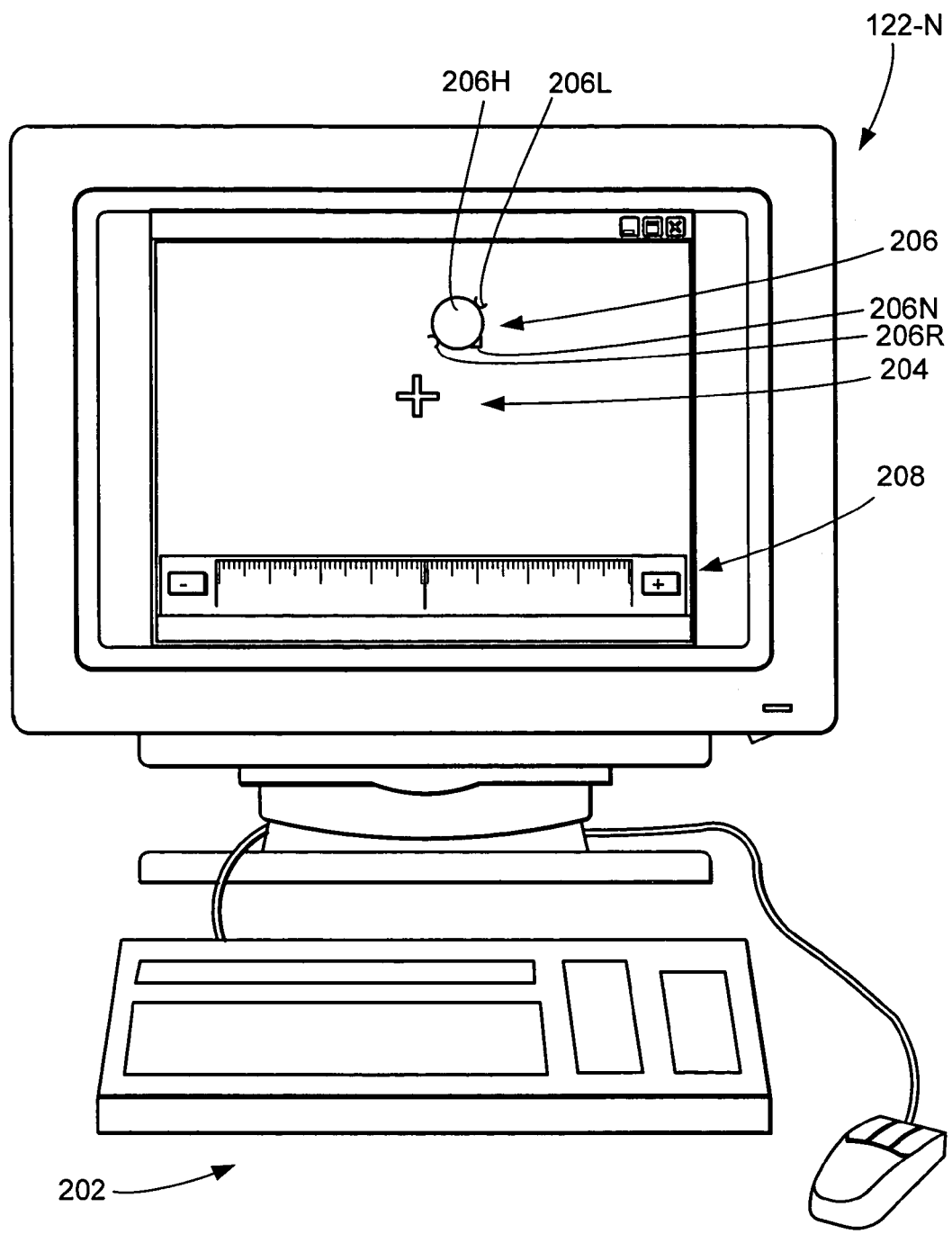
FIG. 2 is a view of a computer displaying a graphical user interface according another embodiment of the present invention.

Referring now to FIGS. 1 and 2, therein is shown the PC 122-N displaying a graphical user interface (GUI) 200 for the remote attendee 125-N. The GUI 200 could appear on the PC 122-N having a control 202, such as a keyboard, mouse, joystick, etc. The control 202 is used to manipulate icons and indicators in the GUI 200.

On the GUI 200, a "+" denotes an icon of a virtual sound location 204 representative of the sound pickup system 104 at the sound location 106 at the primary meeting site 102. A circle denotes an icon of a virtual listening location 206 representative of where the remote attendee 125-N would like to be locationed relative to the sound pickup system 104 or local attendees 105-1 through N if the remote attendee 125-N were physically present at the primary meeting site 102.

The virtual listening location 206 is shown with an iconic representation of the remote attendee's head 206H with a left ear 206L, a right ear 206R, and a nose 206N (over a mouth that is not shown) to provide an indication of the virtual speaking direction. The virtual listening location 206 can be moved around the virtual sound location 204 by manipulating the control 202 to establish a spatial relationship between the virtual listening location 206 and the virtual sound location 204. By using the spatial relationship to process the signals to the listening location 126-N, it is possible to provide a binaural sound at the listening location seeming to have an analogous spatial relationship between the listening location 126-N and the sound location 106 as the relationship between the virtual listening location 206 and the virtual sound location 204.

To the remote attendee 125-N, the binaural sound from the listening unit 126-N communicates the perception that the remote attendee 125-N is walking around the sound location 106. This allows the remote attendee 125-N to amplify a soft-spoken local attendee 105-1 or to steer away from noise sources (such as projector fans) at the primary meeting site 102.

A default places the virtual listening location 206 with the remote attendee's head 206H always facing the virtual sound location 204 to communicate the sense of the remote attendee 125-N walking around the sound pickup system 104 while always facing the sound location 106.

Optionally, the remote attendee 125-N may enter an angle of his/her head into the PC 122-N by using the control 202 to move a pointer in a compass interface 208 on the GUI 200. The entering of the head angle provides a facing direction on the GUI 200, which in the real world communicates the perception of the remote attendee 125-N turning one ear (e.g., right ear 206R in FIG. 2) directly towards a local attendee 105-N.

In operation, the entered angle or the default angle is used to transform the incoming multi-channel audio from the primary meeting site 102 of FIG. 1 into binaural signals to be output over the listening unit 126-N. Binaural presentation of the high-fidelity primary meeting site sound field to the remote attendee 125-N yields a significant increase in intelligibility for the remote attendee 125-N.

The spatial audio conferencing system 100 assumes all sounds of interest at the primary meeting site 102 are coming from a roughly horizontal plane around the small condenser microphones 108-1 through N. It is also assumed that the remote attendee's head is in an upright location. These simplifying assumptions mean that a compelling binaural presentation of the sounds at the primary meeting site 102 can be constructed by varying the interaural time delay (ITD) and interaural level difference (ILD) of the microphone channels to each of the remote attendees' ears. The summation of microphone channel data based on ITD and ILD merely requires the data to be multiplicatively scaled and offset in time, which requires very little computation. ILD and ITD functions based on representative data are well-known in the art.

More complicated signal processing using Head-Related Transfer Functions (HRTFs) is not mandatory, since all the reproduced sounds are assumed to be roughly in the horizontal plane. However, the use of HRTF's can reduce front/back confusion present when using only ITD and ILD. The confusion arises because sounds from both front and back are perceived as coming from the center of the remote attendee's head.

If the remote attendee 125-N speaks above an adjustable noise threshold, the noise-cancelling boom microphone in the listening unit 126-N will transmit his/her voice to the primary meeting site 102 and output it over the speaker unit 131. The speaker unit 131 can be a standard PC speaker.

If additional speaker units 132-134 are distributed at the sound location 106, the remote attendee 125-N can pan his/her voice among the speaker units 131-134 in order to converse more privately with selected local attendees. Systems using even more output channels (e.g., 6-channel AC97 audio is becoming standard on many PC motherboards) are also possible at some additional cost. The use of multiple audio output channels give the remote attendees 125-1 through N more of a unique spatial audio presence at the primary meeting site 102.

It has been discovered that echoes perceived by the remote attendees 125-1 through N can be reduced by attenuating the pickup of small condenser microphones 108-1 through N in proportion to the audio being output by the speaker units 131-134. This reduces echoes without resorting to half-duplex connections and aids in turn-taking with near simultaneous talk from the remote attendees 125-1 through N.

It has also been discovered that there is no perceptible echo at the primary meeting site 102 from the remote attendees 125-1 through N using the listening units 126-1 through N.

Further, it has been discovered that echo cancellation is only needed in two situations. First, it prevents the remote attendees 125-1 through N using the listening units 126-1 through N from being confused by hearing their own speech with a small time delay. Second, in configurations with more than one primary meeting site and corresponding sound pickup devices, it prevents echoes between primary meeting sites.

In one embodiment, the spatial audio conferencing system 100 has sample rates of 22.1 KHz with four channels being transmitted from the primary meeting site 102 and one channel from each actively speaking remote attendee 125-1 through N. An Audio Compression Manager (ACM) is used for transparent run-time audio compression and decompression. The ACM uses a library of external codecs to convert audio data from one format to another. This provides the ability to select different codecs depending on bandwidth and latency requirements. A range of codecs with very good sound quality ranging from 442 to 200 Kb/sec per remote attendee is available. The PC 114 at the primary meeting site 102 acts as an audio server and streams audio to and from the remote PCs 122-1 through N.

It has been found that in remote locations with multiple remote attendees, the multiple remote attendees may share headset outputs under the control of a single remote computer. In this case, head orientation tracking should not be used, since the movement one remote attendees' head will cause sounds to move for all other remote attendees also.

The communication network 118 can be a Virtual Private Network (VPN) without problems using unicast connections.

One approach is to use a User Datagram Protocol (UDP) because it has the lowest latency, which is important for supporting highly interactive conversations. Since UDP does not guarantee packet delivery, basic packet loss detection and concealment techniques are used which do not require additional buffering and latency. These techniques are based on sequence numbers and timestamps available with Real-Time Transport Protocol (RTP).

For remote attendees having Plain Old Telephone Service (POTS) capabilities, the spatial audio conferencing system 100 is implemented in extensions to Voice Over IP (VoIP) technologies to connect the remote attendees over an Internet portal.

A communication bandwidth can further be reduced by using multicasing for sending audio from the primary meeting site 102 to the remote attendees 125-1 through N. In multicasting, the bandwidth requirement for the PC 114 is the same regardless of the number of remote attendees. The PC 114 sends streaming audio to a particular IP-Multicast address to which all the remote PCs 122-1 through N subscribe. The substantial bandwidth savings from multicasting also helps to reduce network congestion and computer load, and it enables the participation of potentially thousands of remote attendees. Other than security issues, most of the limitations of multicasting are policy related (for example, whether a corporation allows its routers to pass multicast packets). In order to avoid such limitations, the spatial audio conferencing system 100 can stream data either in a multicast or in the convential unicast mode.

Figure 3:
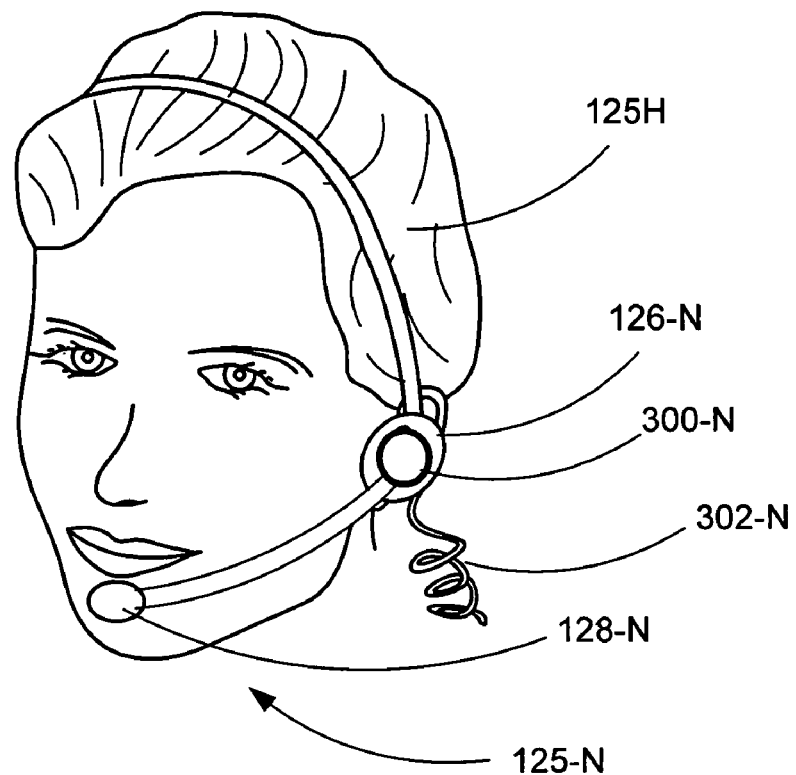
FIG. 3 is a view of a listening location augmented with an orientation tracking device according to another embodiment of the present invention.

Referring now to FIG. 3, therein is shown a listening unit 126-N augmented with an orientation tracking device 300-N. The remote attendee's listening unit 126-N would be typical of the remote attendees' listening units 126-1 through N.

The orientation tracking device 300-N outputs azimuth, and optionally elevation and/or roll. If only azimuth tracking is performed, the remote attendee's head orientation automatically sets the compass interface 208 on the GUI 200 of FIG. 2.

When the remote attendee 125-N moves his/her head 125H while wearing the listening unit 126-N with the orientation tracking device 300-N, sounds are perceived as coming from fixed locations, which appear to be physically present at the remote location 120-N, independent of the orientation (within limits) of the remote attendee's head 125H. A number of different inexpensive methods for tracking head orientation are possible, such as those based on digital compass sensors or gyroscopic sensors.

In one embodiment, the orientation tracking device 300-N is built into the headset cup having a headset cord 302-N attachment to minimize the visual profile.

In other embodiments, the orientation tracking device 300-N may be centered on the headband above the remote attendee's head. The orientation tracking device 300-N can connect to the remote PC 122-N in a number of ways. One embodiment augments the standard microphone and headset plugs with a Universal Serial Bus (USB) plug for interfacing to the orientation tracking device 300-1.

In the alternative, the headset, microphone, and orientation signals can all be transmitted over a single USB connection, such as the headset cord 302-N, eliminating the need for headset and microphone plugs.

With the orientation tracking device 300-N, the location of the remote attendee's head can be used to adjust the relative volume of sound the remote attendee 125-N hears from different directions. For example, if the remote attendee 125-N moves his/her head to the clockwise as viewed from above, sounds clockwise of the sound pickup system 104 at the primary meeting site 102 of FIG. 1 will be amplified and sounds counterclockwise will be attenuated. This effectively enables the remote attendee 125-N to get closer to and focus on the sound sources of interest automatically.

When elevation and roll are also tracked, sounds are also presented to the remote attendee 125-N as coming from above or below the horizontal plane. In order to communicate the perception of vertical displacement, the multi-channel sound inputs must be transformed by the HRTFs previously mentioned. The HRTF used is selected from a library of HRTFs based on the angle of the incident sound source. The HRTFs can accurately model the effects of the remote attendee's head, torso, and external ears (pinnae) on the incoming sounds. Although processing the microphone data with HRTFs is more complicated than just with ITD and ILD alone, it is still within the capability of most laptop computers.

Based on the above, it has also been discovered that it is possible to have a spatial audio conferencing system 100 in which the remote locations 120-1 through N are connected together without a primary meeting site 102. To have effective spatial audio conferencing, the remote attendees 125-1 through N position themselves, or the software positions the remote attendees 125-1 through N, at different positions in a virtual meeting space. Obviously, if all remote attendees 125-1 through N are sitting in the same place in the virtual space, directionality information would be limited.

Similarly, it has been found that it would be possible to have multiple primary meeting sites with each having a sound pickup device. In such a situation, the primary meeting sites are all treated as remote locations.

Figure 4:
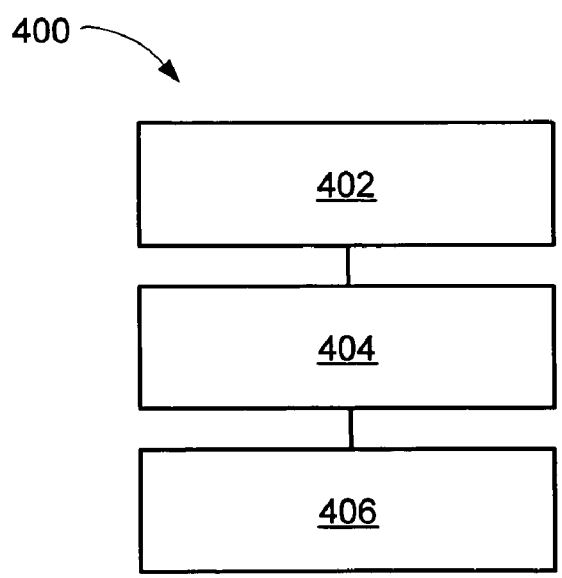
FIG. 4 is a system for audio conferencing in accordance with a further embodiment of the present invention.

Referring now to FIG. 4, therein is shown a system 400 that is a method for audio conferencing in accordance with an embodiment of the present invention. The system 400 comprises: in a block 402, transmitting a signal of a sound at a sound location to a listening location; in a block 404, establishing a relationship between a virtual listening location and a virtual sound location; and in a block 406, processing the signal to provide a binaural sound at the listening location seeming to have the same relationship between the listening location and the sound location as the relationship between the virtual listening location and the virtual sound location.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters set forth herein or shown in the accompanying drawings are to be interpreted in an illustrative and non-limiting sense.

The invention claimed is:

1. An audio conferencing system comprising:
    sending a signal of a sound at a sound location to a listening location, the sound location and the listening location being physical locations;
    establishing a relationship between a virtual listening location and a virtual sound location;
    processing the signal to provide a sound at the listening location seeming to have an analogous relationship between the listening location and the sound location as the relationship between the virtual listening location and the virtual sound location in that the virtual listening location is at the sound location and the virtual sound location is at the listening location; and
    displaying a graphic user interface having a first icon corresponding to a location of a sound pickup system within the sound location and a second icon corresponding to a desired virtual location of a remote attendee within the sound location in relation to the location of the sound pickup system within the sound location, where the remote attendee is not physically located at the sound location but rather is physically located at the listening location such that the second icon indicates a desired location of the remote attendee if the remote attendee were physically located at the sound location.

2. The system as claimed in claim 1 wherein:
establishing the relationship further comprises adjusting a facing direction of the virtual listening location relative to the virtual sound location; and
processing the signal further comprises further processing the signal to provide the sound at the listening location adjusted for the facing direction.

3. The system as claimed in claim 1 further comprising:
sending a signal of a sound at the listening location to the sound location; and suppressing echoes by attenuating only the signal of the sound at the sound location.

4. The system as claimed in claim 1 further comprising:
sending a signal of a sound at the listening location to the sound location; and processing the signal of the sound at the listening location to provide the sound proximate to the sound location to communicate the perception that the sound at the listening location can move around the sound location.

5. The system as claimed in claim 1 further comprising:
tracking at least one of movement, orientation, and a combination thereof of the listening location; and
changing the relationship between the virtual listening location and the virtual sound location based on at least one of movement, orientation, and a combination thereof of the listening location.

6. An audio conferencing system comprising:
sending signals of directional sounds at a sound location to a listening location, the sound location and the listening locations being physical locations;
establishing a spatial relationship between a virtual listening location and a virtual sound location in that the virtual listening location is at the sound location and the virtual sound location is at the listening location;
processing the signals using interaural time delay and interaural level difference to provide binaural sounds representative of the directional sounds at the listening location seeming to have the same analogous spatial relationship between the listening location and the sound location as the spatial relationship between the virtual listening location and the virtual sound location; and
displaying a graphic user interface having a first icon corresponding to a location of a sound pickup system within the sound location and a second icon corresponding to a desired virtual location of a remote attendee within the sound location in relation to the location of the sound pickup system within the sound location, where the remote attendee is not physically located at the sound location but rather is physically located at the listening location such that the second icon indicates a desired location of the remote attendee if the remote attendee were physically located at the sound location.

7. The system as claimed in claim 6 wherein:
establishing the relationship further comprises:
forming an icon of the virtual listening location having a facing direction, and adjusting the facing direction of the virtual listening location relative to the virtual sound location; and processing the signals further comprises further processing the signals to provide the binaural sounds at the listening location adjusted for the facing direction.

8. The system as claimed in claim 6 further comprising:
sending signals of sounds at the listening location to the sound location; and suppressing echoes of the sounds at the listening location by attenuating only the signals of the directional sounds at the sound location in proportion to the signals of sounds at the listening location.

9. The system as claimed in claim 6 further comprising:
sending signals of sounds above an adjustable noise threshold at the listening location to the sound location; and
processing the signals of the sounds at the listening location to provide the sounds at a plurality of locations at the sound location to communicate the perception that the sound at the listening location can move around the sound location.

10. The system as claimed in claim 6 further comprising:
tracking at least one of azimuth movement, elevation movement, roll movement, orientation, and a combination thereof of the listening location; and
changing the spatial relationship and a facing relationship between the virtual listening location and the virtual sound location based on at least one of movement, orientation, and a combination thereof of the listening location.

11. An audio conferencing system comprising:
a communication system for sending a signal of a sound at a sound location to a listening location, the sound location and the listening location being physical locations;
a user interface for establishing a relationship between a virtual listening location and a virtual sound location; and
a computer system for processing the signal to provide a sound at the listening location seeming to have an analogous relationship between the listening location and the sound location as the relationship between the virtual listening location and the virtual sound location in that the virtual listening location is at the sound location and the virtual sound location is at the listening location,
wherein the user interface comprises a graphic user interface having a first icon corresponding to a location of a sound pickup system within the sound location and a second icon corresponding to a desired virtual location of a remote attendee within the sound location in relation to the location of the sound pickup system within the sound location, where the remote attendee is not physically located at the sound location but rather is physically located at the listening location such that the second icon indicates a desired location of the remote attendee if the remote attendee were physically located at the sound location.

12. The system as claimed in claim 11 wherein:
the user interface further comprises a compass interface for adjusting a facing direction of the virtual listening location relative to the virtual sound location; and
the computer system for further processing the signal to provide the sound at the listening location adjusted for the facing direction.

13. The system as claimed in claim 11 wherein the computer system further presses echoes by attenuating the signal of the sound at the sound location.

14. The system as claimed in claim 11 further comprising:
a microphone for sending a signal of a sound at the listening location to the sound location;

a speaker for converting the signals of the sound at the listening location to sound proximate to the sound location; and the computer system for processing the signals of the sounds at the listening location to communicate the perception that the sounds at the listening location can move around to the sound location.

15. The system as claimed in claim 11 further comprising:

an orientation tracking device for tracking at least one of movement, orientation, and a combination thereof of the listening location; and the computer system for changing the relationship between the virtual listening location and the virtual sound location based on at least one of movement, orientation, and a combination thereof of the listening location.

16. An audio conferencing system comprising:

a microphone array for sending signals of directional sounds at a sound location;

a listening unit for receiving the signals at a listening location, the microphone array being part of a sound pickup system, the sound location and the listening location being physical locations;

a graphic user interface establishing a relationship between a virtual listening location and a virtual sound location; and a computer system for processing the signal using interaural time delay and interaural level difference to provide binaural sounds at the listening unit seeming to have an analogous relationship between the listening location and the sound location as the relationship between the virtual listening location and the virtual sound location in that the virtual listening location is at the sound location and the virtual sound location is at the listening location, wherein the graphic user interface has a first icon corresponding to a location of the sound pickup system within the sound location and a second icon corresponding to a desired virtual location of a remote attendee within the sound location in relation to the location of the sound pickup system within the sound location, where the remote attendee is not physically located at the sound location but rather is physically located at the listening location such that the second icon indicates a desired location of the remote attendee if the remote attendee were physically located at the sound location.

17. The system as claimed in claim 16 wherein:

the graphic user interface further comprises:

an icon of the virtual listening location having a facing direction, and a compass interface for adjusting the facing direction of the virtual listening location relative to the virtual sound location; and the computer system for further processing the signals to provide the binaural sound at the listening location adjusted for the facing direction.

18. The system as claimed in claim 16 wherein the sound pickup subsystem is transparent except at a bottom thereof, the microphone array is disposed at a top of the sound pickup subsystem, and one or more microphone preamplifiers are disposed at the bottom of the sound pickup subsystem.

19. The system as claimed in claim 16 further comprising:

a microphone for sending sounds above an adjustable noise threshold at the listening location to the sound location;

a plurality of speakers around the microphone array; and the computer system processing the signals of the sounds at the listening location to provide noise-canceled sounds at the plurality of speakers to communicate the perception that the sounds at the listening location can move relative to the sound location.

20. The system as claimed in claim 16 further comprising:

a orientation tracking device for tracking at least one of azimuth movement, elevation movement, roll movement, orientation, and a combination thereof of the listening location; and the computer system for changing the spatial relationship and a facing relationship between the virtual listening location and the virtual sound location based on at least one of movement, orientation, and a combination thereof of the listening location.

\* \* \* \* \*

UNITED STATES PATENT AND TRADEMARK OFFICE
CERTIFICATE OF CORRECTION

| | |
|---|---|
| PATENT NO. | : 7,720,212 B1 |
| APPLICATION NO. | : 10/909079 |
| DATED | : May 18, 2010 |
| INVENTOR(S) | : Norman Paul Jouppi et al. |

Page 1 of 1

It is certified that error appears in the above-identified patent and that said Letters Patent is hereby corrected as shown below:

In column 8, line 63, in Claim 13, delete "presses" and insert -- suppresses --, therefor.

Signed and Sealed this

Twenty-fourth Day of August, 2010

David J. Kappos
*Director of the United States Patent and Trademark Office*